3,561,003
SPRAY DRYING PROCESS
Bernard J. Lanham, Chessington, and Vladimir C. Hykel, London, England, assignors to The Magnavox Company, Ft. Wayne, Ind., a corporation of Delaware
No Drawing. Filed Nov. 21, 1967, Ser. No. 684,606
Claims priority, application Great Britain, Nov. 23, 1966, 52,372/66
Int. Cl. C08j *1/07;* C08g *53/02*
U.S. Cl. 106—22        11 Claims

ABSTRACT OF THE DISCLOSURE

Particulate resins of particle size no more than 30 microns are produced by spray-drying a mixture comprising a solution of the resin and a non-solvent for the resin. Particulate inks may be prepared by incorporating in the mixture before spray-drying a colorant and/or a filler. The amount of non-solvent in the mixture depends on the particular non-solvent, resin and resin solution used, but it does not exceed the amount required to cause incipient precipitation of the resin from solution. Resins such as polymeric fatty acid amides, epoxy resins or polystyrene are most advantageously treated in this process.

---

The present invention is concerned with the production of particulate synthetic resins by spray-drying.

Spray-drying, as a method of subdividing resinous materials to convert them to powder form, has a number of advantages over mechanical methods such as grinding and ball milling, in particular the particles obtained are generally spherical rather than irregular in shape and the particles have a far narrower range of particle sizes so that it is generally unnecessary to classify the particles before use. It is necessary for certain purposes to obtain synthetic resins in the form of powders having particle sizes of from 5 to 30 microns, or even 5 to 15 microns, these very finely divided resin powders particularly being required for use, when the appropriate colourants and fillers are included therein, as powder inks for electrostatic printing, certain copying processes and dry powder printing. It has been found, however, that certain synthetic resins, including some of those which are particularly suitable for use as the resin binder in particulate inks, are difficult or impossible to form into powders having such small particle sizes by the direct spray-drying of their solutions on conventional equipment, especially such equipment relying on disc-type atomisers. The syntheric resins principally involved are low melting polyamides, more particularly polymeric fatty acid amides, such as those available under the trademark "Versamid," epoxy resins, and polystyrene. When solutions of these resins in solvents therefor are spray-dried, powders having a particle size of 50 microns or greater or, in some cases, only fibres are obtained.

We have now developed a process which enables particles of these resins having sizes below 30 microns to be obtained by spray-drying. According to the invention the process comprises the steps, in sequence, of:

(1) forming a solution of the resin in a solvent therefor;
(2) adding to the solution, in such a manner as to form a uniform mixture, a diluent which is a non-solvent for the resin in an amount such that the spray-dried product of step (3) has a particle size of not more than 30 microns; and
(3) spray-drying the product of step (2).

It is to be understood that the amount of non-solvent diluent which must be added to the resin solution in order to obtain a spray-dried product having a particle size of not more than 30 microns will depend on the nature of the resin, the solvent and the diluent. The amount of non-solvent diluent required will not exceed the amount required to cause incipient precipitation of the resin from solution. When the solvent is not a good solvent for the resin used so that at the resin concentration used (typically 10 to 15% by weight) the solution is approaching saturation, less non-solvent diluent is necessary than when the resin solution is further from saturation (i.e. when the solvent used is a better solvent for the resin). In the former case, it may only be necessary to add an amount of non-solvent diluent corresponding to 50% of that required to bring about incipient precipitation of the resin, while in the latter case, it is usually necessary to add from 80% or 90% up to 100% of the amount of non-solvent diluent required to cause incipient precipitation. In all cases, the amount of non-solvent diluent necessary can be found by routine tests following the procedures of the invention. Incipient precipitation is evidenced by cloudiness or haziness of the solution.

The invention is particularly useful in the production of particulate inks when before, during or after step (2) but before step (3), the colourant and/or finely divided filler are added. In the production of magnetic inks, a magnetic filler, such as a magnetic oxide, for example iron oxide, will be used. In some cases, the magnetic filler will itself impart the desired colour to the particulate ink, in which case it will not be necessary to add a separate colourant. The non-solvent diluent may be miscible, partially miscible or immiscible with the resin solvent used. In the latter two cases, the diluent must be added to the solution in such a manner, for example with vigorous agitation, as to disperse the diluent very finely. Additional care must then be taken to ensure that if sufficient non-solvent diluent is added to bring the system to the point of incipient precipitation, that point is noticed in the system which may already be slightly turbid due to the dispersion of the non-solvent diluent in the solvent.

The conditions of the spray-drying operation carried out after the addition of the non-solvent diluent should, of course, be chosen to suit the particular solution being treated; suitable conditions will lie within the range of those normally used and can readily be determined by those familiar with spray-drying.

Suitable solvents and non-solvent diluents (or precipitants) for use in this process will, of course, depend on the nature of the resin used. With epoxy resins and low melting polyamides, we have successfully used liquid chlorinated hydrocarbons, such as chloroform, and toluene/isopropanol mixtures as the resin solvent and methanol, acetone and acetone/water mixtures as the non-solvent diluent.

Where additives are required to be present with the synthetic resin in the spray-dried powder, they can be added at any convenient stage in the process. For example they can be dissolved in the solvent with the resin or in the non-solvent diluent or dispersed in the solution together with or after the addition of the non-solvent diluent. In the case of the production of particulate inks, for example, it is usually convenient to disperse the colourant(s) and, if used, finely divided filler(s) in the solution after the addition of the non-solvent diluent, vigorous agitation being used to disperse these materials and the solution/dispersion obtained then being spray-dried immediately.

In the production of particulate inks, the particles of resin, including colourant and filler if present, formed in the spray-drying step tend to agglomerate. This is, of course, undesirable and agglomeration can be reduced or prevented by adding a de-agglomerating agent, such as silica aerogel, for example that available under the trademark "Aerosil," to the spray-dried powder.

The dispersion of insoluble additives (and also of the non-solvent diluent, if it is immiscible with the solvent) does not have to be storage-stable, at least in relation to the additives, and spray-dried inks may be successfully produced from dispersions which are not stable on storage, providing that arrangemnts are made to keep the dispersion stirred up to the point of its introduction into the atomiser of the spray-drying apparatus.

In order that the invention may be more fully understood, the following examples are given by way of illustration only:

EXAMPLE 1

137.5 g. of solid epoxy resin (Epikote 1001) and 13 g. of dicyandiamide were dissolved in 1237.5 g. of a 1:1 toluene/isopropanol mixture at room temperature. Methanol was added to the solution with stirring until the first signs of cloudiness appeared when the addition was stopped. 55 g. of sub-micron sized titanium dioxide (a filler) and 19.2 g. of Spirit Black (a dye) were then dispersed in the solution with vigorous agitation. The solution/dispersion was then spray-dried, the air inlet temperature being less than 100° C. and the outlet temperature being 50–59° C. The atomiser disc was 2" in diameter and rotated at 35,000 r.p.m.

The powder formed was very black and consisted of spherical particles, the majority of which had a diameter of about 5 microns, while a minor proportion had diameters of up to 20 microns. The powder was made free flowing by adding 1% by weight of "Aerosil" and sieving through a 200 B.S. mesh screen (having openings of 74 microns).

A thin layer of the powder was applied to a paper substrate and the coated substrate was positioned 2 cm. below a 250 watt infra-red lamp to simulate the print fixing step of a dry powder printing process. Rapid fusion took place and an excellent "print" was obtained.

EXAMPLE 2

A low melting polyamide (Versamid 940) was dissolved in a 1:1 toluene/isopropanol mixture at room temperature to give a solution containing 10% by weight of polyamide. Methanol was added to the solution with stirring until the first signs of cloudiness appeared when the addition was stopped. Sub-micron sized titanium dioxide and Spirit Black (as filler and colourant dye respectively) were then dispersed in the solution with vigorous agitation, the amount of titanium dioxide being 40% based on the weight of the polyamide and the amount of Spirit Black being 14% on the same basis. The solution/dispersion was then spray-dried, using an air inlet temperature of 115° C.–125° C. and an outlet temperature of 75° C.–85° C. The atomiser disc was 2" in diameter and was rotated at 35,000 r.p.m.

The particles of the powder obtained were spherical and had an average size of 4–8 microns. The powder was rendered free flowing by addition of 1% "Aerosil" and sieving through a 200 B.S. mesh screen.

A thin layer of the powder was applied to a paper substrate and the coated substrate was positioned 2 cm. below a 250 watt infra-red lamp to simulate the print fixing step of a dry powder printing process. Rapid fusion took place and an excellent "print" was obtained.

EXAMPLE 3

25 g. of Piccolastic A–75 (a polystyrene blend manufactured by the Pennsylvanian Industrial Chemical Corporation) were dissolved in 225 g. of chloroform at room temperature. 10 g. of sub-micron sized titanium dioxide (a filler) and 3.5 g. of E.B. Spirit Black (a dye manufactured by Williams of Hounslow) were then dispersed in this solution with vigorous agitation. Still with agitation 50 g. of water containing a few drops of Lissapol-N (a surface active agent manufactured by I.C.I. Ltd.) were added. This mixture was then spray-dried in a laboratory spray-dryer, the air inlet temperature being less than 100° C. and the outlet temperature 50° C. The atomiser disc was 2" in diameter and was rotated at 35,000 r.p.m.

The powder formed consisted of spherical particles about 10–15 microns in size. The fusion of the powder on paper and polystyrene substrates was rapid and good.

EXAMPLE 4

This example illustrates the preparation of a "Versamid"-based ink containing a blue pigment colourant.

200 g. of a polyamide resin (Versamid 940) were dissolved in a mixture of 900 g. toluene and 900 g. isopropanol using a high speed, homogenising stirrer. Methanol was then carefully added to the solution, with rapid stirring, until the first signs of cloudiness were detected. The addition was stopped at this stage, about 750 g. of methanol having been added. 85.6 g. of titanium dioxide (a filler) was then added and dispersed in the composition with rapid stirring. 12 g. of a blue phthalocyanine pigment (Irgalite Fost Brilliant Blue Gla—marketed by by Geigy Ltd.) were then added and similarly dispersed with rapid stirring. The solution/dispersion was then immediately spray-dried in a laboratory spray-dryer using an air inlet temperature of 120° C.–125° C. and an outlet temperature of 80° C.–85° C. The speed of the disc atomiser was about 35,000 r.p.m. and the rate of feed was comparatively slow, the solution/dispersion being stirred right up to its introduction into the atomiser. The blue powder obtained consisted of spherical particles ranging in size between 5 and 10 microns. 1% by weight of "Aerosil" was added to the powder and thoroughly dispersed therein. A thin layer of the powder was applied to a paper substrate and the coated substrate was positioned 2 cm. below a 250 watt infra-red lamp to simulate the print fixing step of a dry powder printing process. Rapid fusion took place and an excellent "print" was obtained.

EXAMPLE 5

This example illustrates the preparation of an ink containing magnetic pigment.

A solution of "Versamid" 940 polyamide resin in a mixture of toluene and isopropanol was prepare, and methanol added as described in Example 4. 160 g. of a magnetic iron oxide (average particle size approximately 1 micron) were then dispersed in the solution using a homogeniser stirrer. Spray-drying was carried out in conditions similar to those described in Example 4. The resulting dark coloured powder consisted of spherical particles, 4–10 microns in size. After the addition of "Aerosil" and application to a paper substrate as described in Example 4, it was found that the powder fused rapidly to give a good "print," under the action of infra-red radiation.

EXAMPLE 6

This example illustrates the preparation of an ink based on Piccolastic/Coumarone resin mixture.

30 g.' of Coumarone pale solid resin, 10 g. of Coumarone pale liquid resin (marketed by Anchor Chemical Cp. Ltd., Manchester 11, England) and 52 g. Piccolastic A 75, were dissolved in 1,000 g. of methylene chloride at room temperature. The solution was diluted to the point of precipitation with methanol, essentially as described in Example 4. The amount of methanol required was about 420 g. 10 g. of "Aerosil" and 4 g. of a red pigment (Irgalite Crimson 4 BD, marketed by Geigy Ltd.) were then dispersed in the composition with a homogeniser stirrer essentially as described in Example 4. Stirring was continued for 2 hours to ensure even dispersion, and the composition was then spray-dried immediately in conditions essentially similar to those described in Example 4 except that the inlet temperature was about 60° C. and the outlet temperature 40° C.–45° C. The particles of the resulting red powder were spherical and ranged in size between 10–40 microns, the majority being about 15 microns. When submitted to a printing test as described in Example 4, the powder was found to fuse rapidly and give a good "print."

EXAMPLE 7

This example illustrates the preparation of a spray-dried colour concentrate.

50 g. of a pentaerythritol ester of dimeric resin acid (Pentalyn K, marketed by the Hercules Powder Co.) were dissolved at room temperature in 500 g. of toluene. Methanol (approximately 300 g.) was added to the solution until the point of incipient precipitation. 50 g. of a red pigment (Irgalite Rubbine 6 BP, marketed by Geigy Ltd.) was then dispersed in the solution with a homogeniser stirrer. The solution was spray-dried essentially as described in Example 4, at an air inlet temperature of 120° C.–125° C. and outlet temperature of 80° C.–85° C.

The resulting powder consisted of spherical particles 2–10 microns in size, the majority being between 3 and 5 microns. Since the powder was to be used as a colour concentrate for making up liquid ink formulations no heat fusion test was carried out.

We have described our new process in relation to the spray-drying of synthetic resins which are normally difficult or impossible to form into powders of small particle size (below 50 microns) by the direct spray-drying of their solutions on disc-type atomisers. However the process is also applicable to natural and synthetic resins, such for example as modified phenolic resins, coumarone, resins, rosin and shellac, which can be formed into such finely divided powders by conventional spray-drying techniques and there are certain advantages in applying our process to such other resins. In particular the spray-drying operation is generally easier to carry out and requires less critical control of the spray-drying conditions.

What we claim is:

1. A process for the production of particulate polymeric fatty acid amides, epoxy resins or polystyrene having a particle size of not more than 30 microns by spray-drying, which comprises the steps, in sequence, of:
    (1) forming a solution of the resin in a solvent therefor;
    (2) adding to the solution, in such a manner as to form a uniform mixture, a diluent which is a nonsolvent for the resin in an amount from 50% to 100% of that required to cause incipient precipitation, and
    (3) spray-drying the product of step (2).

2. A process according to claim 1 wherein the resin is suitable for use as a resinous component of a particulate ink, and before, during, or after step (2), but before step (3), a finely divided filler is added.

3. A process according to claim 1 wherein the resin is suitable for use as the resinous component of a particulate ink, and before, during, or after step (2), but before step (3), a colourant is added.

4. A process according to claim 3 wherein the colourant is added after step (2).

5. A process according to claim 3 wherein filler is added after step (2).

6. A process according to claim 5 wherein the filler is a magnetic oxide.

7. A process according to claim 1 wherein in step (1) a polymeric fatty acid amide or an epoxy resin is dissolved in a liquid chlorinated hydrocarbon or a mixture of toluene and isopropanol.

8. A process according to claim 7 wherein in step (2) the diluent is methanol, acetone or water or mixtures thereof.

9. A process according to claim 1 wherein agglomeration of the particles produced in step (3) is prevented or reduced by adding a de-agglomerating agent thereto.

10. A process according to claim 1 wherein in step (2) at least 90% of the amount of diluent required to cause incipient precipitation is added.

11. A process according to claim 1 wherein in step (2) 80% to 100% of the amount of diluent required to cause incipient precipitation is added.

References Cited
UNITED STATES PATENTS

| | | | |
|---|---|---|---|
| 3,431,249 | 3/1969 | Bohrer et al. | 260—94.9X |
| 3,422,049 | 1/1969 | McClain | 260—94.9X |
| 3,372,153 | 3/1968 | Turner et al. | 260—94.9X |
| 3,215,663 | 11/1965 | Weisberg | 260—41.5X |
| 3,203,916 | 8/1965 | Voet | 260—41.5UX |
| 3,194,781 | 6/1965 | Hedberg et al. | 260—41.5UX |
| 2,595,852 | 5/1952 | Hopper et al. | 159—48 |
| 2,379,237 | 6/1945 | Jenkins | 260—41 |

DONALD E. CZAJA, Primary Examiner

C. W. IVY, Assistant Examiner

U.S. Cl. X.R.

106—23, 27, 241, 243, 287; 117—13, 21; 159—48; 252—62.1; 260—18, 29.2, 29.6, 32.8, 33.4, 33.6, 33.8, 34.2, 37, 41, 93.5; 264—13

UNITED STATES PATENT OFFICE
CERTIFICATE OF CORRECTION

Patent No. 3,561,003        Dated February 2, 1971

Inventor(s) Bernard J. Lanham and Vladimir C. Hykel

It is certified that error appears in the above-identified patent and that said Letters Patent are hereby corrected as shown below:

Column 1, lines 4 and 5, cancel "The Magnavox Company, Ft. Wayne, Ind., a corporation of Delaware" and substitute -- Molins Limited, London, England, a British company --.

Signed and sealed this 13th day of June 1972.

(SEAL)
Attest:

EDWARD M. FLETCHER, JR.
Attesting Officer

ROBERT GOTTSCHALK
Commissioner of Patent

PO-1050
(5/69)

UNITED STATES PATENT OFFICE
CERTIFICATE OF CORRECTION

Patent No. 3,561,003            Dated February 2, 1971

Inventor(s) Bernard J. Lanham and Vladimir C. Hykel

It is certified that error appears in the above-identified patent and that said Letters Patent are hereby corrected as shown below:

| Column | Line  | Error       | Way it Should Read |
|--------|-------|-------------|--------------------|
| 1      | 49-50 | "Syn-teric" | -- Syn-thetic --   |
| 3      | 13    | "137.5 g."  | -- 137.5 G. --     |
| 3      | 18    | "55 g."     | -- 55 G. --        |
| 3      | 65    | "25 g."     | -- 25 G. --        |
| 3      | 68    | "10 g."     | -- 10 G. --        |
| 4      | 10    | "200 g."    | -- 200 G. --       |
| 4      | 17    | "85.6 g."   | -- 85.6 G. --      |
| 4      | 19    | "12 g."     | -- 12 G. --        |
| 4      | 20    | "Gla"       | -- GLA --          |
| 4      | 43    | "160 g."    | -- 160 G. --       |
| 4      | 57    | " 30 g."    | -- 30 G. --        |
| 4      | 64    | "10 g."     | -- 10 G. --        |
| 5      | 6     | "50 g."     | -- 50 G. --        |
| 5      | 10    | "50 g."     | -- 50 G. --        |

Signed and sealed this 3rd day of July 1973.

(SEAL)
Attest:

EDWARD M. FLETCHER, JR.
Attesting Officer

Rene Tegtmeyer
Acting Commissioner of Patents